United States Patent
Bakar (10) Patent No.: US 9,496,968 B2
(45) Date of Patent: Nov. 15, 2016

(54) PROXIMITY DETECTION BY MOBILE DEVICES

(71) Applicant: GOOGLE INC., Mountain View, CA (US)

(72) Inventor: Majd Bakar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 13/790,637

(22) Filed: Mar. 8, 2013

(65) Prior Publication Data

US 2014/0253813 A1    Sep. 11, 2014

(51) Int. Cl.
*H04B 14/00* (2006.01)
*H04W 8/00* (2009.01)
*H04W 4/02* (2009.01)
*H04W 4/00* (2009.01)

(52) U.S. Cl.
CPC ............. *H04B 14/00* (2013.01); *H04W 4/021* (2013.01); *H04W 8/005* (2013.01); *H04W 4/008* (2013.01)

(58) Field of Classification Search
CPC ........................ H04R 3/00; H04L 67/04; H04L 67/1063; H04L 67/104; H04L 63/18; H04L 63/08; H04W 8/26; H04W 48/08; H04W 12/06; H04W 76/02; H04W 84/18; H04W 48/16; H04W 84/10
See application file for complete search history.

(56) References Cited

U.S. PATENT DOCUMENTS

| 7,894,769 B2 | 2/2011 | Ganley et al. |
| 7,996,514 B2 | 8/2011 | Baumert et al. |
| 8,214,853 B2 | 7/2012 | Dasher et al. |
| 8,316,400 B1 | 11/2012 | Kravets |
| 2004/0052387 A1 | 3/2004 | Norris et al. |
| 2005/0219068 A1 | 10/2005 | Jones et al. |

(Continued)

FOREIGN PATENT DOCUMENTS

| WO | 2008113827 A2 | 9/2008 |
| WO | 2012/148242 A2 | 11/2012 |

OTHER PUBLICATIONS

"Set up the Netflix App", Netflix on Xbox LIVE, dated Jan. 7, 2012, retrieved on Feb. 11, 2013 from support.xbox.com/en-US/apps/netflix/netflix-setup, 2 pages.

(Continued)

*Primary Examiner* — William Nealon
(74) *Attorney, Agent, or Firm* — Brake Hughes Bellermann LLP (57) ABSTRACT

A processor of a mobile device initiates a listening session including listening for a message from a remote service and receiving the message from the remote service. The message indicates that a first device is within a predetermined range of the mobile device. In response to receiving the message from the remote service, a network session is automatically initiated. The network session includes obtaining a signature via the network, the signature being uniquely associated with the first device. In response to obtaining the signature via the network, the mobile device initiates an access session with the first device, including utilizing the signature to present a user interface on the mobile device that includes access to the first device. The access session is automatically terminated in response to detecting a change in the listening session.

19 Claims, 4 Drawing Sheets

(56) References Cited

U.S. PATENT DOCUMENTS

| | | |
|---|---|---|
| 2006/0259927 A1 | 11/2006 | Acharya et al. |
| 2007/0115876 A1* | 5/2007 | Doshi ............... H04L 29/12009 370/329 |
| 2007/0149124 A1* | 6/2007 | Onozawa ..................... 455/41.2 |
| 2007/0297426 A1 | 12/2007 | Haveson et al. |
| 2008/0181154 A1 | 7/2008 | Sherman |
| 2009/0116441 A1 | 5/2009 | Park et al. |
| 2009/0210932 A1 | 8/2009 | Balakrishnan et al. |
| 2009/0252355 A1 | 10/2009 | Mao |
| 2010/0081466 A1 | 4/2010 | Mao |
| 2010/0199341 A1 | 8/2010 | Foti et al. |
| 2010/0274859 A1* | 10/2010 | Bucuk ........................... 709/206 |
| 2010/0297946 A1 | 11/2010 | Alameh et al. |
| 2011/0067075 A1 | 3/2011 | Barry |
| 2011/0211524 A1 | 9/2011 | Holmes et al. |
| 2011/0320612 A1* | 12/2011 | Oka ...................... H04W 4/008 709/227 |
| 2012/0051187 A1 | 3/2012 | Paulson |
| 2012/0108282 A1 | 5/2012 | Li et al. |
| 2012/0159338 A1 | 6/2012 | Mountanos et al. |
| 2012/0243158 A1 | 9/2012 | Gentil et al. |
| 2013/0115940 A1 | 5/2013 | Zhou et al. |
| 2013/0336497 A1* | 12/2013 | Duplan .................... H04R 3/00 381/77 |
| 2014/0087770 A1* | 3/2014 | Cho ........................ H04W 4/02 455/457 |
| 2014/0284323 A1 | 9/2014 | Albrecht et al. |

OTHER PUBLICATIONS

"Meet Roku", dated Jan. 16, 2013, retrieved on Feb. 20, 2013 from www.roku.com/meet-roku, 3 pages.

"Meet Boxee TV", Boxee, Inc., retrieved on Feb. 20, 2013 from www.boxee.tv/#/features, 36 pages.

International Preliminary Report on Patentability received for PCT Patent Application No. PCT/US2014/021830, mailed on Sep. 17, 2015, 10 pages.

U.S. Final Office Action received for U.S. Appl. No. 14/200,965, mailed on Nov. 13, 2015, 17 pages.

International Search Report and Written Opinion for International Application No. PCT/US2014/021830, mailed on Jun. 24, 2014, 12 pages.

Office Action for EP Application No. 14714059.4, mailed Aug. 12, 2016, 6 pages.

* cited by examiner

PROXIMITY DETECTION BY MOBILE DEVICES

TECHNICAL FIELD

This disclosure generally relates to interactions between a first device such as a media player, and a mobile device, and more particularly, to detecting a first device within a vicinity of the mobile device.

BACKGROUND

People that watch television may want to control a television within their vicinity (or another media player) with a mobile device such as a smartphone or laptop. Yet, a special pairing between two devices may employ a complex registration process that requires explicit access or hardware extensions to force a pairing over channels such as infrared channels. These techniques may require a user to be aware of the pairing and may require coupling hardware that is not inherent to either the television or the mobile device. Additionally, these types of explicit pairings may suffer from susceptibility to distance and different forms of interference, as well as being limited to one-to-one pairing, requiring the mobile device interface to be tied to one and only one television.

SUMMARY

A stationary device with a user interface may periodically emit a signature signal or a combination of signals over at least one network. A mobile device may receive a notice from a remote service that the stationary device is located in a certain proximity to the mobile device, and in response to the notice, the mobile device may search the network for the signature signal(s). The signature signal may optionally contain access information that allows the mobile device to automatically access and pair with the stationary device.

In one general aspect, a processor of a mobile device initiates a listening session including listening for a message from a remote service and receiving the message from the remote service. The message indicates that a first device is within a predetermined range of the mobile device. In response to receiving the message from the remote service, a network session is automatically initiated. The network session includes obtaining a signature via the network, the signature being uniquely associated with the first device. In response to obtaining the signature via the network, the mobile device initiates an access session with the first device, including utilizing the signature to present a user interface on the mobile device that includes access to the first device. The access session is automatically terminated in response to detecting a change in the listening session.

In another general aspect, a system includes at least one processor, and a memory that stores instructions that, when executed by the at least one processor, cause the system to perform operations of: in response to receiving a notification from a remote server, initiating a listening session including listening for a signal from a media player device and receiving the signal from the media player device; initiating a communication session, the communication session including locating, via a network, a unique signature associated with the media player device; initiating an access session with the media player device, including utilizing the signature to present a user interface that includes access to the media player device; and automatically terminating the access session in response to detecting a change in the listening session.

Other implementations of this aspect include corresponding systems, apparatus, and computer programs, configured to perform the actions of the methods, encoded on computer storage devices.

One or more of the implementations of the subject matter described herein may provide one or more of the following advantages. The disclosed methods and systems allow discovery and interactivity between a mobile device and a media player device without the need for explicitly pairing the two devices. For example, a user may walks from one room of a house to another, while the user's phone may automatically pair and un-pair with the closest television, without requiring user input for the pairing or un-pairing.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
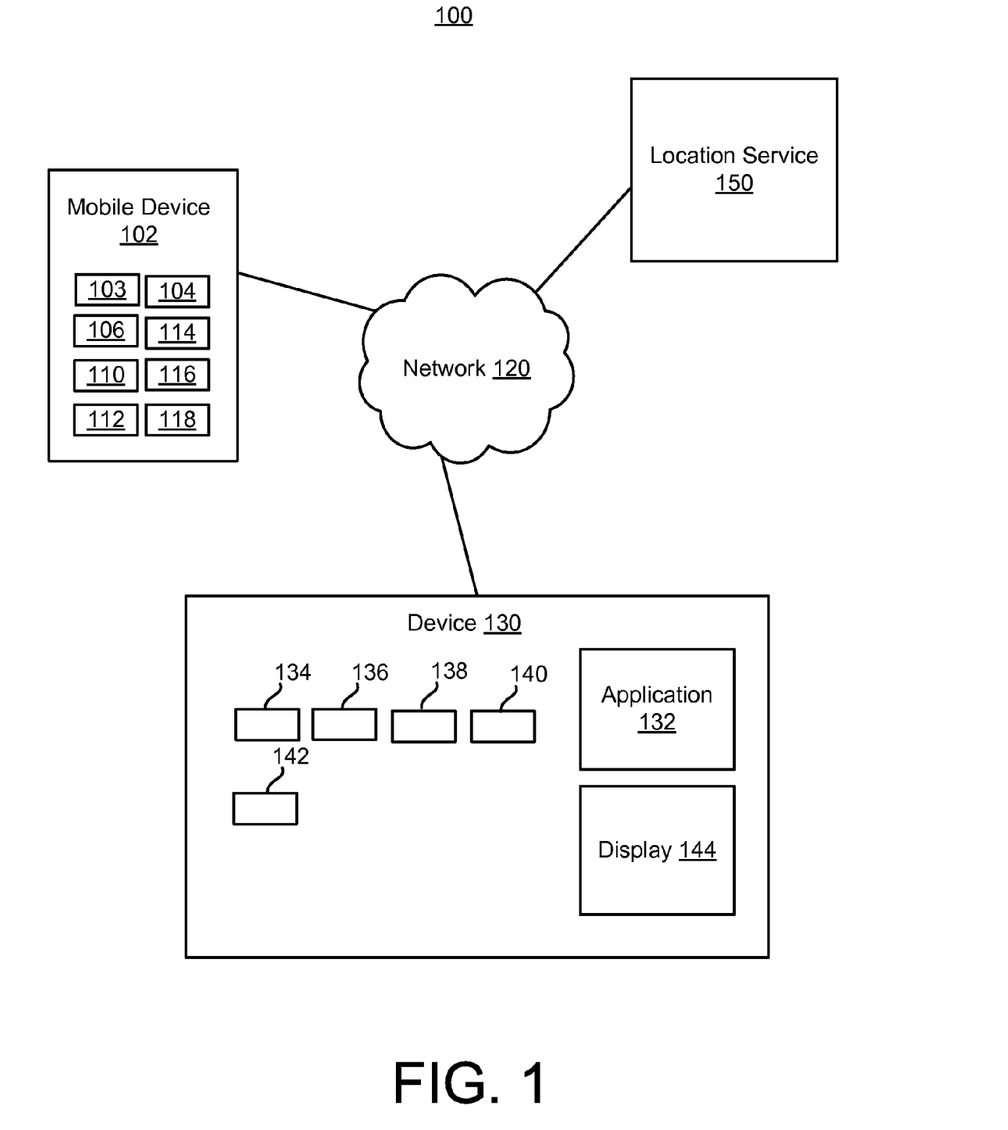
FIG. 1 is a block diagram of a system that can be used to provide device detection.

FIG. 1 is a block diagram of a system that can be used to provide identification delegation. System 100 may include a mobile device 102, a device 130, and a location service 150, which are interconnected through at least one network 120.

Mobile device 102 may be a computer, a smart phone, a laptop, or a similar device that may execute a user interface, download and execute software applications, and communicate with device 130, and location service 150. Mobile device 102 may include a display screen 103 and a device detection application 104 that a user downloaded (e.g., installed) from a website or online application store. In some implementations, the device detection application 104 may recognize various sensors that are associated with mobile device 102, and may communicate with those sensors. For example, mobile device 102 may include a variety of sensors, such as a radio frequency (RF) sensor 106, a microphone 110, a GPS sensor 112, a BLUETOOTH sensor 114, a WIFI sensor 116, and an infrared sensor 118. The sensors illustrated in mobile device 102 are merely for illustration, as other sensors may be included. Various alternative and additional examples of mobile devices are described in more detail below with respect to FIG. 4.

Network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

Device 130 is a computing device with an application 132 and a display screen 144. As an example, device 130 may be a television. Device 130 may execute software applications (such as application 132) and may communicate with mobile devices 102 and location service 150. Device 130 may include various components that may emit various signals, such as an audio component 134, an infrared component 136, a WIFI component 138, a BLUETOOTH component 140, and a radio frequency component 142. The components illustrated in association with device 130 are merely for illustration, as other components may be included. Various alternative and additional examples of devices are described in more detail with respect to FIG. 4.

The device 130 may periodically or continuously broadcast various identification signals (e.g., beacon signals) over network 120. The device 130 may send signals over different networks simultaneously. For example, device 120 may send audio, BLUETOOTH, and WIFI beacon signals at the same time. In some implementations, as discussed in more detail below with respect to FIG. 2, the device 130 may emit a unique identification signal over network 120. As an example, the unique identification signal may include a basic service set identification (BSSID) that is entered or programmed by a user of the device 130. In some implementations, the unique identification signal may be unique because it is randomly generated. The unique identification can be a globally unique identifier (GUID), which may have a probability of the same number being generated randomly twice being negligible, or a universally unique identifier (UUID), or a name that matches a certain pattern, as examples. The mobile device 102 may detect various signals emitted by one or more components of the device 130, using various sensors, for example when mobile device 102 comes within a predetermined range of device 130. For example, the infrared sensor 118 of mobile device 102 may detect an infrared signal emitted by infrared component 136 of device 130. As another example, the microphone 110 may detect an audio signal emitted by audio component 134.

In some implementations, mobile device 102 may automatically listen for such signals at all times, without user input, even when a display screen of the mobile device is dimmed, in sleep mode, or otherwise not active. In various implementations, mobile device 102 may be configured by a user to listen for such signals. As an example, mobile device 102 may listen for signals via components 106, 110, 112, 114, 116, and 118 for example using application 104. Application 104 may, in some implementations, request that a user enter a login or other user account credentials to listen for signals.

The location service 150 may be a computer or device that provides location services, as discussed in more detail below. In the arrangement shown in FIG. 1, device 130, which may be a television, may optionally identify itself to the location service 150 and may, for example by providing coordinates, GPS data, WIFI signals, other signals such as near field communication signals, or information from which the location service 150 may identify or approximate the location of device 130. Similarly, the mobile device 102 may also identify itself to the location service 150. In some implementations, the location service 150 may maintain a data store of all devices (including, for example, mobile device 102) that have identified themselves to the service, as well as other information associated with the devices, such as location data. In some implementations, where users have consented to the use of such data, the location service 150 may obtain location information about device 130 in other ways, for example by receiving data from other devices (not shown) that have connected to or identified the device 130.

In some implementations, mobile device 102 may receive information from location service 150 about device 130 (e.g., location data). As an example, mobile device 102 may receive a notification from location service 150. The notification may include a message that the mobile device is within a predetermined range (e.g., 50 feet) of device 130. In response to receiving the notification, the mobile device may automatically begin to search network 120 for a unique signal from the device 130. For example, the mobile device 130 may search for and detect a WIFI signal (emitted from the WIFI component 138 of device 130) using the WIFI sensor 116. As an example the WIFI signature could be a WIFI BSSID pattern of any set of number or letters.

It will be appreciated that any number of alternative or additional networks, servers, services, mobile devices, or devices may be included in system 100. The use of one mobile device 102, one device 130, and one location service, is merely for illustration. Moreover, it will be appreciated that the illustration depicted in FIG. 1 does not illustrate proximity. For example, as discussed in more detail below, in various implementations, mobile device 102 may be within five feet of device 130, while location service 150 is located at a different location.

One or more of the implementations of the subject matter described herein may provide one or more of the following advantages. The disclosed methods and systems allow discovery and interactivity between a mobile device and a media player device without the need for explicitly pairing the two devices. For example, a user may walks from one room of a house to another, while the user's phone may automatically pair and un-pair with the closest television, without requiring user input for the pairing or un-pairing.

Figure 2:
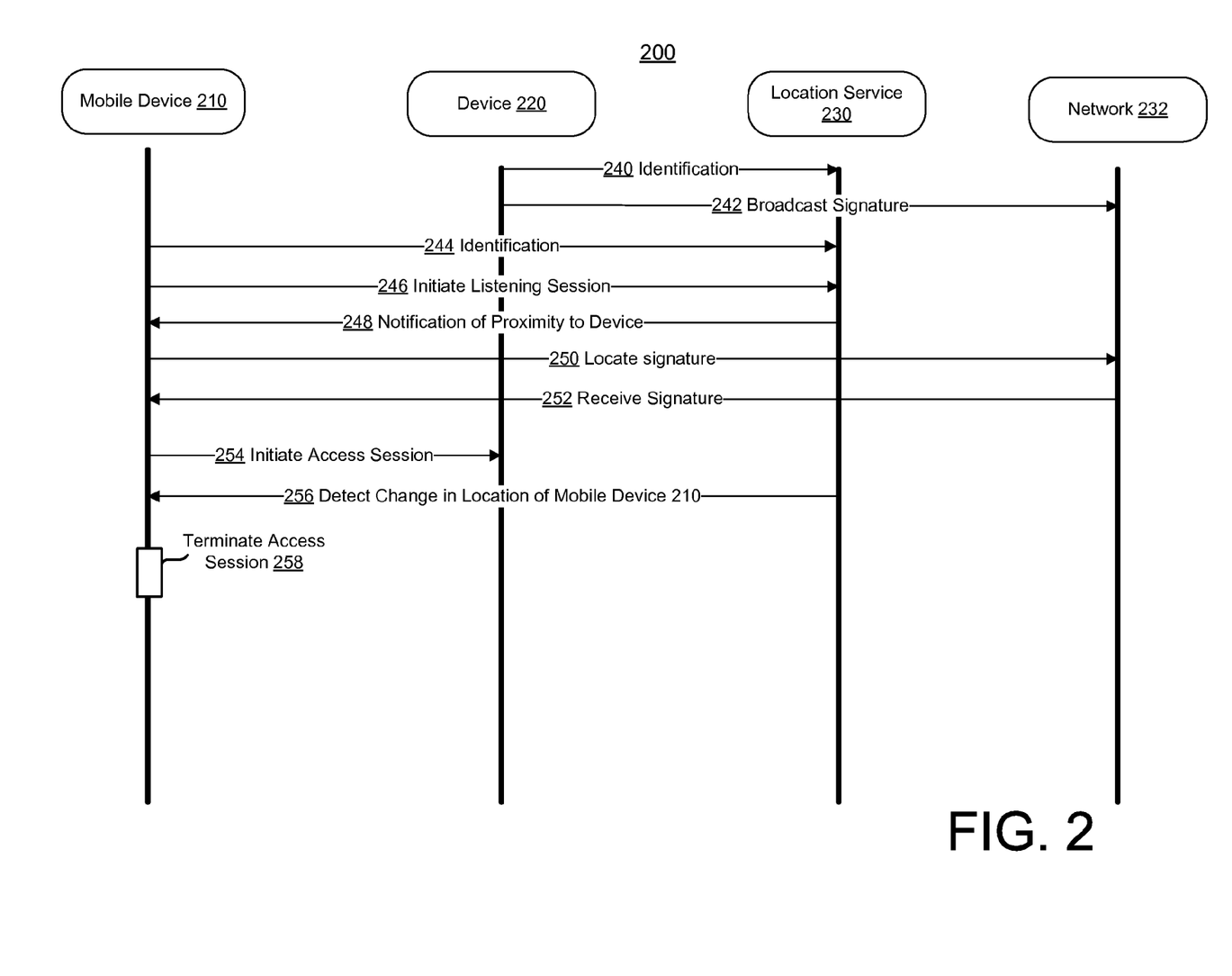
FIG. 2 is a sequence diagram illustrating an example of a system implementing device detection.

FIG. 2 is a sequence diagram illustrating an example of a system 200 implementing device detection. The system 200 may include a mobile device 210, a device 220, a location service 230, and a network 232. The mobile device 210 may be a smartphone or laptop, such as device 102 shown in FIG. 1, which may execute applications. In one example, a device detection application may have been downloaded from a service or content provider web site or an online application store (such as device detection application 104 described above with respect to FIG. 1).

The device 220 may be a media player, for example a television or a gaming device such as an XBOX, which can interact with a video streaming data service. In the illustrated embodiment, the black lines associated with each of the components of the system (e.g., mobile device 210, device 220) represent the execution, by at least one microprocessor, of a process associated with that component.

The location service 230 may be a service operated by at least one remote server, such as the location service 150 described above with respect to FIG. 1. The network 232 may be any type of network or combination of networks, such as described in more detail below with respect to FIG. 4. Although the network 232 is depicted as a separate element from the location service 230, in some implementations, the network 232 may be used for communications between the location service 230 and the mobile device 210 and the device 220. In the illustrated implementation, FIG. 2 shows an example of a detection of the mobile device 210 within a predetermined range of device 220.

Action 240 illustrates that, in one implementation, an identification is made by the device 220 to the location service 230. Such an identification may be sent by an application (e.g., a device detection application) that is resident on the device 220 or that was downloaded to the device 220 from a service or content provider web site. The identification may include, as examples, a name, IP address, unique identifier, and location data of the device 220. In some implementations, the identification 240 may be made once, when the device 220 is initiated, and it will be understood that action 240 is an optional action.

Action 242 illustrates that the device 220 periodically broadcasts a unique signature over the network 232. In some implementations, the unique signature may be a unique BSSID pattern and the network 232 may be a WIFI network. In some implementations, the device 220 may emit a unique signature over more than one network 232 at a time. For example, the device 220 may emit a unique BLUETOOTH signature, a unique BSSID signature, a unique audio signal, and a unique infrared signal at the same time across one or more networks. In some implementations, the device 220 may emit a combination of signals as its unique signature (such as an infrared signal and an audio signal). The signals may be emitted periodically.

Action 244 illustrates that the mobile device 210 makes an identification to the location service 230. Such an identification may be made by a device detection application downloaded to the mobile device 210 from a service or content provider web site. The identification may include, as examples, a name or unique identifier of the mobile device 210, and location data of the mobile device 210 (e.g., including GPS or WIFI data). In some implementations, the identification 244 may be made once, and in some implementations, some or all the identification 244 may be continuous or periodic (e.g., the mobile device 210 may send GPS location to the location service 230 every hour or every time the device detection application is initiated, or every time the location of the mobile device 210 changes by more than 100 meters). In various implementations, the location service 150 may extrapolate a location of the mobile device 210 (e.g., on a continuous or periodic basis) using information provided by the mobile device.

Action 246 illustrates that the mobile device 210 initiates a listening session with the location service 230. In some implementations, the listening session may be initiated every time the device detection application is initiated or is otherwise executing. In some implementations, action 246 may be continuous or periodic (e.g., the mobile device 210 may initiate a listening session with the location service 230 every hour or every time the display screen of the mobile device 210 is turned on).

The location service 230 may perform a calculation to determine the proximity of the mobile device 210 to the device 220, for example based on GPS coordinates, relative location of the devices, information provided by device 220 when it identified itself to the location service 230, etc. This proximity calculation can be based on a threshold distance (e.g., 500 feet) so that one or more devices within a threshold distance of one another may be notified or otherwise informed of a proximity to another device. In some implementations, the location service 230 may only account for registered (e.g., identified) devices that have identified themselves to location service 230 using an application such as device detection application 104 shown in FIG. 1.

Action 248 illustrates that location service 230 notifies the mobile device 210 of its proximity to the device 220. In some implementations, the notification may include a message that the mobile device is within a predetermined range (e.g., 50 feet) of device 220. In response to receiving the notification, the mobile device may automatically begin to search network 232 for a signature signal from the device 220, as illustrated by action 250. For example, the mobile device 210 may search for and detect a WIFI signal (emitted from a WIFI component of the device 210) using a WIFI sensor of the mobile device. In some implementations, the mobile device 210 may request a user input or authorization before searching the network 232.

Action 252 illustrates that the mobile device 210 receives the signature from the network 232. In some implementations, the signature may contain information about how to access the device 220, such as location information. Upon or after receiving the signature, the mobile device may initiate an action session with the device 220, as illustrated by the action 254 (for example, using the location information and signature). The access session may include, as an example, a user interface display on the mobile device 210, which may be used to control aspects of a user interface or other display of the device 220. For example, a user of the mobile device 210 may use the mobile device 210 as a remote user interface to control movies, music, or other content provided on a display screen of device 220.

Action 256 illustrates that the location service 230 may detect a change in the location of the mobile device 210. The location service 230 may detect the change based on, for example, GPS coordinates of the mobile device 210. In response to detecting a change in the location of the mobile device 210, the location service 230 may notify the mobile device 210, and the mobile device 210 may terminate the access session with the device 220, as illustrated by action 258, or perform a user visible action on the screen of the device 220. In some implementations, the mobile device 210 (for example using the same device detection application that accessed the device 220) may itself detect a change in its location, such that the mobile device 210 is no longer within the predetermined range of the device 220. In that example, the mobile device may automatically terminate the access session (e.g., using the device detection application), for example without any user input. In some implementations, the device 220 may terminate the access session instead of the mobile device 210. A user may also terminate the access session at any time, for example via a user interface of the mobile device 210 or the device 220.

In various implementations, the system 200 may allow for multiple pairings and un-pairings between mobile devices and media player devices without requiring user actions. For example, as a user walks from one room of a house to another, the user's phone may automatically pair and un-pair with the closest television, using system 200, without requiring user input.

Figure 3:
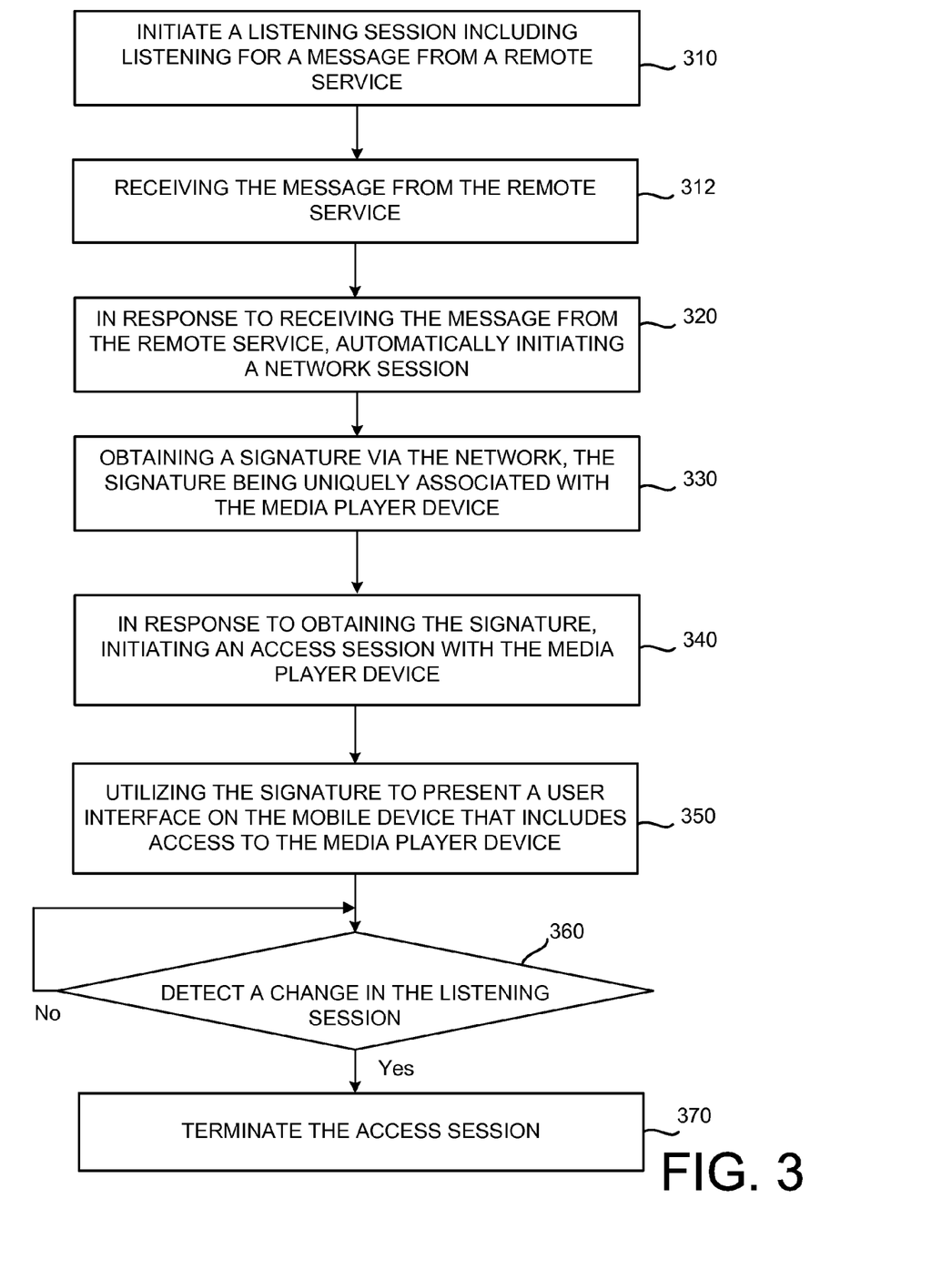
FIG. 3 is a flowchart of a process for providing device detection.

FIG. 3 is a flowchart of a process for providing device detection. The process illustrated in FIG. 3 may be performed at least in part by a computing device, for example, the mobile device 102 shown in FIG. 1 or the mobile device 210 shown in FIG. 2. As shown in FIG. 3, a mobile device may initiate a listening session including listening for a message from a remote service (310). In some implementations, the mobile device may initiate the listening session using an application downloaded (e.g., installed) from an online store.

The listening session may include receiving the message from the remote service (312). The message indicates that a media player device is within a predetermined range of the mobile device (e.g., 500 feet).

In response to receiving the message from the remote service, the mobile device may automatically initiate a network session (320). The network session may include obtaining a signature via the network, the signature being uniquely associated with the media player device (330). In response to obtaining the signature at the mobile device, the mobile device may initiate an access session with the media player device (340). The access session may include utilizing the signature to present a user interface (e.g., via display screen 103 shown in FIG. 1) on the mobile device that includes access to the media player device (350).

The system (e.g., the mobile device or in some implementations the remote service) may determine whether it detects a change in the listening session (360). As an example of a change in the listening session, the remote service may determine that the mobile device is no longer within the predetermined range of the media player device. If no change is detected, (360, no) the system may continue with the access session while it continues to determine whether it detects a change in the listening session. If the system does detect a change in the listening session (360, yes), for example if the mobile device is no longer within the predetermined range of the media player device, the system (e.g., via the mobile device, the media player, and/or the remote service) may terminate the access session (370) (e.g., automatically, or with user input).

The process shown in FIG. 3 may begin again whenever the mobile device is turned on (even if a display screen is dimmed) or when certain applications executed on the mobile device are activated. In some implementations, such applications may execute in a background process of the mobile device. As an example, if a user was watching a movie with a friend but the user has left the house and taken his phone with him, the system may determine that the mobile device is no longer within 100 feet of the media player device, and thus may terminate the access session. In various alternative or additional implementations, the system may terminate the access session various ways, for example after a predetermined amount of time (e.g., minutes, hours), or in response to a user request to terminate the session (e.g., via the mobile device or via another device), when a user manually shuts down the system or mobile device, or when the system detects another mobile device in a predetermined range of the system that is requesting access to the media player device.

Figure 4:
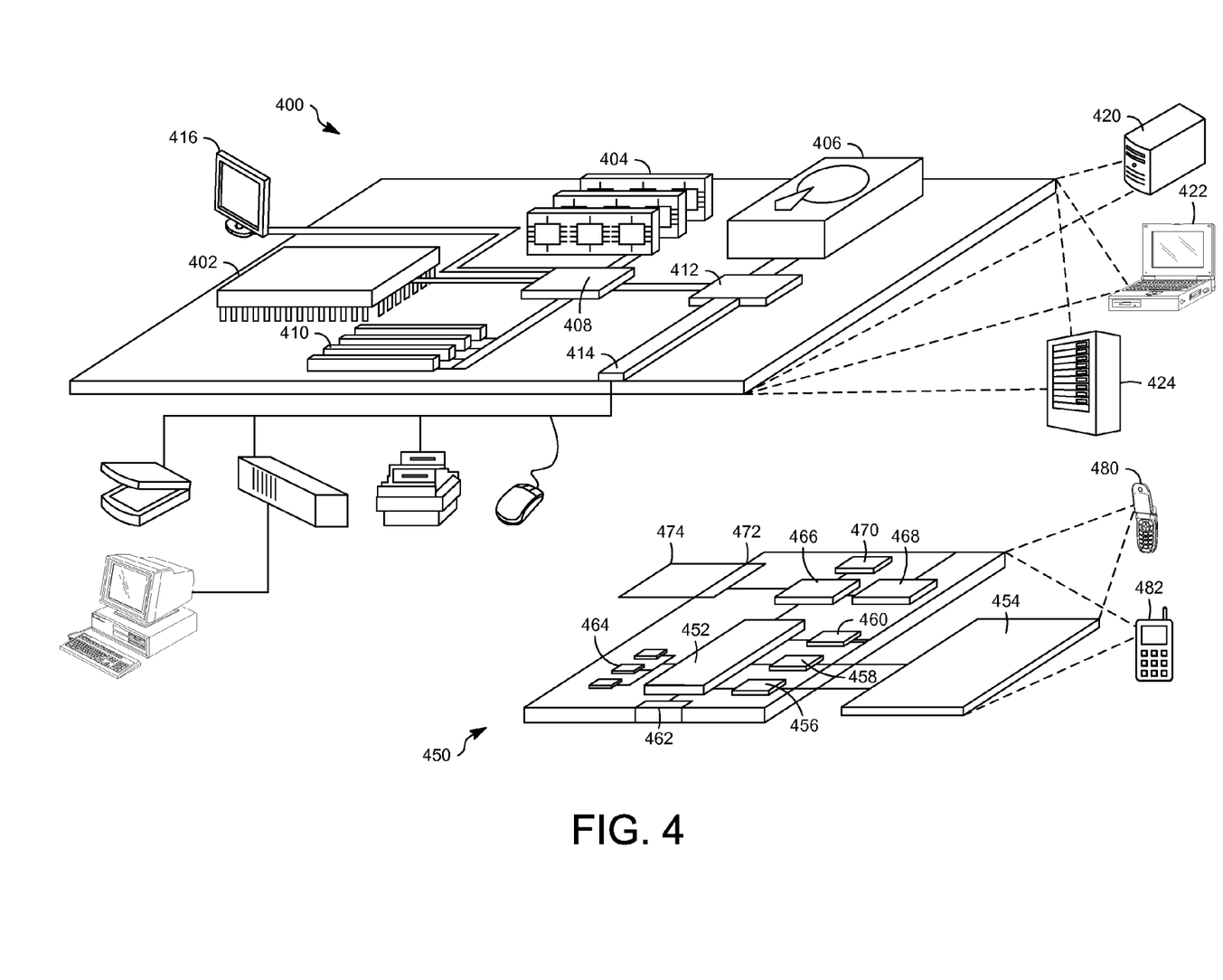
FIG. 4 illustrates an example of a computing device and a mobile computing device that can be used to implement the techniques described here.

FIG. 4 illustrates an example of a computing device and a mobile computing device that can be used to implement the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. In some implementations, the memory includes a combination of volatile and non-volatile memory units, for example as described above with respect to FIG. 3. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is illustrative only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion bus 414. The low-speed expansion bus, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, which may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a BLUETOOTH, WIFI, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method comprising:
    initiating, by a processor of a mobile device, a listening session including listening for a message from a remote location service via a wireless network and receiving the message from the remote location service via the wireless network, the message indicating that a device is within a predetermined range of the mobile device;
    in response to receiving the message from the remote location service, automatically initiating a network session to obtain a signature, the signature being uniquely associated with the device, the network session being communicated over a network including one of a wireless near field communication network, an audio network or a wireless local area network, the signature being received, via the network session, as a plurality of signals broadcast by the device, the plurality of signals including at least one of an infrared signal and an audio signal;
    in response to obtaining the signature via the network, storing the signature in association with the device at the mobile device, and
    initiating, by the mobile device, an access session, communicated over the network, with the device, the access session including utilizing the stored signature to present a user interface on a display of the mobile device that provides access to and control of the device;
    monitoring, by the processor of the mobile device, the listening session to detect a change in the listening session based on the mobile device, the device and the predetermined range;
    in response to detecting the mobile device is outside of the predetermined range, terminating the access session and return processing to the monitoring of the listening session; and
    in response to detecting the mobile device returns to within the predetermined range, re-establishing the access session using the stored signature and returning processing to the monitoring of the listening session.

2. The method of claim 1, further comprising:
    determining, by the remote location service, a location of the mobile device based on a signal from the mobile device.

3. The method of claim 1, further comprising:
    receiving, by the remote location service, a registration of a location of the device.

4. The method of claim 1, wherein the signature is a unique pattern and includes access information that allows the mobile device to automatically access and pair with the device.

5. The method of claim 1, further comprising:
    detecting a pairing session between the mobile device and the device;
    determining that the mobile device is no longer within the predetermined range of the device; and
    in response to the determining, terminating the pairing session.

6. A mobile device comprising:
    at least one processor; and
    a memory that stores instructions that, when executed by the at least one processor, cause the mobile device to perform operations of:
        in response to receiving a first notification from a location service operating on a remote server via a wireless network, initiating a listening session including listening for a signal from a device and receiving the signal from the device via the wireless network;
        initiating a communication session, the communication session including locating, via a network including one of a wireless near field communication network, an audio network or a wireless local area network, a unique signature associated with the device, the signature being received, via the communication session, as a plurality of signals broadcast by the device, the plurality of signals including at least one of an infrared signal and an audio signal;
        in response to locating the unique signature associated with the device, storing the unique signature in the memory;
        initiating an access session, communicated over the network, with the device, including utilizing the stored signature to present a user interface on a display of the mobile device that provides access to and control of the device;
        first monitoring, by the at least one processor, the listening session to receive a second notification from the location service operating on the remote server, the second notification indicating a change in the listening session based on the mobile device, the device and a predetermined range;
        in response to determining the second notification indicates the mobile device is outside of the predetermined range, terminating the access session;
        second monitoring, by the at least one processor, the listening session to receive a third notification from the location service operating on the remote server, the third notification indicating a change in the listening session based on the mobile device, the device and the predetermined range; and
        in response to determining the third notification indicates the mobile device returns to within the predetermined range, re-establish the access session using the stored signature and return processing to the first monitoring of the listening session.

7. The mobile device of claim 6, wherein the operations further comprise:
    automatically initiating the communication session in response to locating the signal associated with the device.

8. The mobile device of claim 6, wherein the signal is an audio signal.

9. The mobile device of claim 8, wherein the receiving includes detecting the audio signal by a microphone of the system.

10. The mobile device of claim 6, wherein the signal is a WIFI signal.

11. The mobile device of claim 6, wherein the notification includes a message that the device is within a predetermined range of the system.

12. The mobile device of claim 6, further comprising:
determining that the system is no longer within a predetermined range of the device; and
in response to determining that the system is no longer within the predetermined range, automatically terminating the access session.

13. The mobile device of claim 6, further comprising:
terminating the access session after a predetermined amount of time.

14. A non-transitory computer readable medium containing instructions that, when executed by a processor of a mobile computing device, cause the mobile computing device to:
initiate a listening session including listening for a message from a remote location service via a wireless network and receiving the message from the remote location service via the wireless network, the message indicating that a device is within a predetermined range of the mobile computing device;
in response to receiving the message from the remote location service, automatically initiate a network session to obtain a signature uniquely associated with the device, the network session being communicated over a network including one of a wireless near field communication network, an audio network or a wireless local area network, the signature being received, via the network session, as a plurality of signals broadcast by the device, the plurality of signals including at least one of an infrared signal and an audio signal;
in response to obtaining the signature via the network, store the signature in association with the device at the mobile device, and
initiate, by the mobile computing device, an access session, communicated over the network, with the device, the access session including utilizing the signature to present a user interface on a display of the mobile computing device that provides access to and control of the device;
monitor, by the processor of the mobile device, the listening session to detect a change in the listening session based on the mobile device, the device and the predetermined range;
in response to detecting the mobile device is outside of the predetermined range, terminate the access session and return processing to the monitoring of the listening session; and
in response to detecting the mobile device returns to within the predetermined range, re-establish the access session using the stored signature and return processing to the monitoring of the listening session.

15. The non-transitory computer readable medium of claim 14, wherein the instructions further cause the mobile computing device to:
send, to the remote location service, a set of location data associated with the mobile computing device.

16. The non-transitory computer readable medium of claim 14, wherein the signature is a unique pattern and includes access information that allows the mobile computing device to automatically access and pair with the device.

17. The non-transitory computer readable medium of claim 14, wherein
the instructions further cause the mobile computing device to: determine that the mobile computing device is no longer within a predetermined range of the device; and
in response to determining that the mobile computing device is no longer within the predetermined range, automatically terminate the access session.

18. The mobile device of claim 6, wherein the device is a media player device.

19. The non-transitory computer readable medium of claim 14, wherein the device is a media player device.

* * * * *